(12) United States Patent
Taghavi et al.

(10) Patent No.: US 9,748,868 B2
(45) Date of Patent: Aug. 29, 2017

(54) TRIBOELECTRIC COMPOSITE FOR MECHANICAL ENERGY HARVESTING AND SENSING

(71) Applicant: FONDAZIONE ISTITUTO ITALIANO DI TECNOLOGIA, Genoa (IT)

(72) Inventors: Majid Taghavi, Bristol (GB); Virgilio Mattoli, Vicopisano (IT); Lucia Beccai, Leghorn (IT); Barbara Mazzolai, Castiglioncello (IT)

(73) Assignee: FONDAZIONE ISTITUTO ITALIANO DI TECNOLOGIA, Genoa (IT)

( * ) Notice: Subject to any disclaimer, the term of this patent is extended or adjusted under 35 U.S.C. 154(b) by 0 days.

(21) Appl. No.: 15/120,217

(22) PCT Filed: Mar. 17, 2015

(86) PCT No.: PCT/IB2015/051945
§ 371 (c)(1),
(2) Date: Aug. 19, 2016

(87) PCT Pub. No.: WO2015/140710
PCT Pub. Date: Sep. 24, 2015

(65) Prior Publication Data
US 2017/0070164 A1 Mar. 9, 2017

(30) Foreign Application Priority Data
Mar. 18, 2014 (IT) .............................. TO2014A0218

(51) Int. Cl.
*H02N 1/04* (2006.01)
*H01B 1/20* (2006.01)

(52) U.S. Cl.
CPC ................. *H02N 1/04* (2013.01); *H01B 1/20* (2013.01)

(58) Field of Classification Search
USPC ..................................... 174/126.2
See application file for complete search history.

(56) References Cited

U.S. PATENT DOCUMENTS

| 833,290 A | * | 10/1906 | Cornelius | .............. | H01R 4/186 |
| | | | | | 174/126.2 |
| 4,868,565 A | * | 9/1989 | Mettes | .................. | H01B 11/20 |
| | | | | | 174/126.2 |

(Continued)

FOREIGN PATENT DOCUMENTS

| DE | 102011080149 A1 | 1/2013 |
| WO | 2011070986 A1 | 6/2011 |

OTHER PUBLICATIONS

Hou et al. "Triboelectric nanogenerator built inside shoe insole for harvesting walking energy" Nano Energy (2013) 2, 856-862.

(Continued)

*Primary Examiner* — Jeremy C Norris
*Assistant Examiner* — Muhammed Azam
(74) *Attorney, Agent, or Firm* — Arent Fox LLP; Michael Fainberg

(57) ABSTRACT

Composite material comprising a matrix of elastic and electrically insulating material, and a filler of electrically conducting material embedded within the matrix. The filler forms a conductive path defining an active electrode adapted to be associated with a reference electrode for forming an electrical signal output. A deformable gap is formed between an outer surface of the conductive path and an inner surface of the matrix, in such a way that the application of a mechanical load to the composite material causes the surface of the conductive path and the surface of the matrix to be brought closer together, and the removal of the mechanical (Continued)

load causes the surface of the conductive path and the surface of the matrix to be moved away from one another as a result of the elastic force of the material of the matrix.

8 Claims, 3 Drawing Sheets

(56) References Cited

U.S. PATENT DOCUMENTS

| | | | | |
|---|---|---|---|---|
| 5,514,513 | A * | 5/1996 | Cunningham | G03G 9/1131 430/111.32 |
| 5,516,618 | A * | 5/1996 | Cunningham | B01J 3/008 430/111.32 |
| 6,004,717 | A * | 12/1999 | Creatura | G03G 9/1132 430/111.35 |
| 2004/0182753 | A1 * | 9/2004 | Allen, III | B03C 1/18 209/4 |
| 2006/0199094 | A1 * | 9/2006 | Grande | G03G 9/10 430/111.32 |
| 2008/0212262 | A1 | 9/2008 | Micallef | |
| 2010/0011768 | A1 * | 1/2010 | Hacsi | F03G 7/00 60/721 |
| 2010/0321478 | A1 * | 12/2010 | Sliwa | G02B 27/2271 348/51 |
| 2011/0050181 | A1 * | 3/2011 | Post | H02N 1/04 320/166 |
| 2011/0312500 | A1 * | 12/2011 | Odier | C23C 18/04 505/236 |
| 2012/0018191 | A1 * | 1/2012 | Yoshida | C23C 18/32 174/126.2 |
| 2012/0259376 | A1 * | 10/2012 | Godden | A61K 9/0009 607/2 |
| 2013/0048340 | A1 * | 2/2013 | Bando | H01G 11/22 174/126.2 |
| 2013/0049531 | A1 * | 2/2013 | Wang | H02N 1/04 310/309 |
| 2013/0133923 | A1 * | 5/2013 | Leis | H01G 11/38 174/126.2 |
| 2014/0246950 | A1 * | 9/2014 | Wang | H02N 1/04 310/310 |
| 2014/0246951 | A1 * | 9/2014 | Wang | H02N 1/04 310/310 |
| 2014/0300248 | A1 * | 10/2014 | Wang | H02N 1/04 310/300 |
| 2014/0338458 | A1 * | 11/2014 | Wang | G01L 1/005 73/658 |
| 2015/0357942 | A1 * | 12/2015 | Zhang | H02N 1/002 310/310 |
| 2016/0105538 | A1 * | 4/2016 | Olah | H02N 1/04 455/573 |
| 2016/0209278 | A1 * | 7/2016 | Hus | G01L 1/16 |
| 2016/0315561 | A1 * | 10/2016 | Shin | H02N 1/04 |
| 2016/0344308 | A1 * | 11/2016 | Wang | H02N 1/04 |
| 2016/0359429 | A1 * | 12/2016 | Byun | H02N 1/04 |

OTHER PUBLICATIONS

Zhu et al. "Linear-Grating Triboelectric Generator Based on Sliding Electrification" Nano Letters (2013) 2282-2289.

Zhu et al. "Power-generating shoe insole based on triboelectric nanogenerators for self-powered consumer electronics" Nano Energy (2013) 2, 688-692.

International Search Report and Written Opinion PCT/IB2015/051945 date of mailing Oct. 14, 2015.

* cited by examiner

TRIBOELECTRIC COMPOSITE FOR MECHANICAL ENERGY HARVESTING AND SENSING

FIELD OF THE TECHNOLOGY

The present invention relates in general to energy harvesting devices and sensors.

BACKGROUND

Various devices known as "energy harvesting" devices have been developed in recent years for generating electrical energy from the environment. A considerable amount of work has been done on the development of techniques for converting mechanical energy to electrical energy, based on electromagnetic, electrostatic or piezoelectric effects. In particular, solutions based on triboelectric and electrostatic effects have recently been developed [1, 2, 3, 4]. These solutions propose multilayer devices having layers of polymer material and electrode layers, in which the triboelectric effect is based on the friction between two layers of different polymer materials [1, 3], or between a layer of polymer material and a layer of conductive material [2, 4]. The devices of the known solutions are configured to respond to external compressive stresses applied in a direction perpendicular to the surface of the layers, or to respond to relative sliding between the layers.

SUMMARY

One object of the present invention is to provide a solution having a high degree of adaptability, to permit the development of devices capable of reacting to different types of mechanical stresses.

Another object of the invention is to provide a solution that can be implemented using economically accessible materials and processes which are simple in technical terms.

These and other objects are achieved according to the invention by a composite material, comprising a matrix of elastic and electrically insulating material, and a filler of electrically conducting material embedded within the matrix, said filler forming within the matrix at least one conductive path defining an active electrode adapted to be associated with a reference electrode for forming an electrical signal output, wherein at least one deformable gap containing an electrically insulating fluid is formed between an outer surface of the conductive path and an inner surface of the matrix, in such a way that a variation of mechanical load applied to the composite material causes a variation of distance between the outer surface of the conductive and the inner surface of the matrix, said composite material being capable of producing a signal at the electrical signal output depending on the electrostatic effect and a triboelectric charge accumulated by the conductive path, in response to mechanical stresses applied to the composite material.

The material according to the invention may be shaped in any way, according to the required application. Because of the arrangement of the conductor within the matrix, it is possible to make the material capable of reacting to different external stresses without any constraints in terms of the surface or the direction of application of the stresses.

Furthermore, the material according to the invention may be made from commonly available materials, such as copper and PDMS, using simple and economically convenient manufacturing processes, so that it is also suitable for mass production.

The quantity of charge generated on the conductive path of the filler and on the matrix depends on the positions of the materials in the triboelectric series, their spatial configuration, the roughness of the surface and the environmental conditions. The generated signal also depends on the number and dimensions of the deformable gaps, as well as on the density of the filler within the matrix. By adjusting these parameters, the performance of the material can be optimized according to the application.

BRIEF DESCRIPTION OF THE DRAWINGS

Further characteristics and advantages of the material according to the invention will be made clearer by the following detailed description of an embodiment of the invention, given with reference to the attached drawings which are provided purely as non-limiting illustrations, in which.

DETAILED DESCRIPTION

Figure 1:
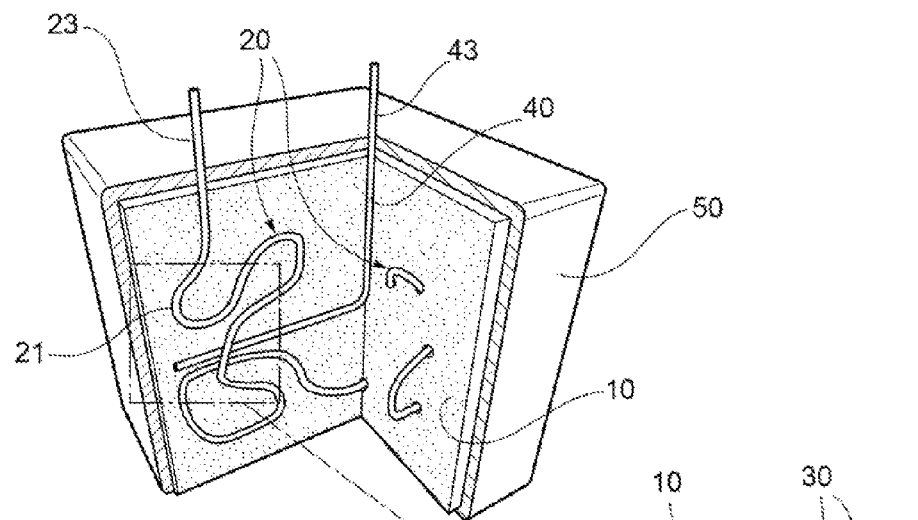
FIG. 1 is a schematic representation showing an exploded view of a device made from a material according to the invention.
Figure 2:
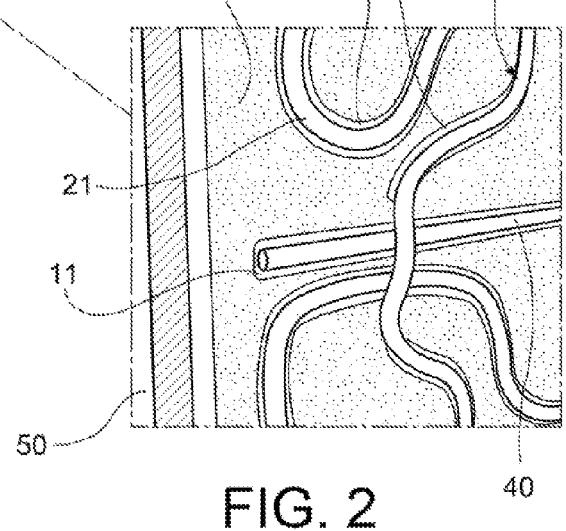
FIG. 2 is a view on an enlarged scale of a detail of the device of FIG. 1.
Figure 4:
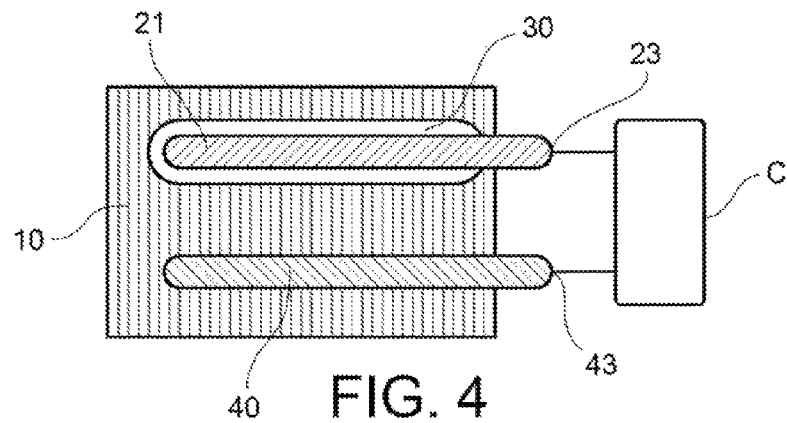
FIGS. 4 to 10 are schematic representations of different possible configurations of a device made from the material according to the invention.

With reference to FIGS. 1, 2 and 4, a device made from a composite material according to the invention is illustrated.

The composite material in question comprises a matrix 10 of elastic and electrically insulating material, and a filler 20 of electrically conducting material embedded within the matrix 10. The matrix is generally made of polymer material, and may be composed of one or more materials.

Figure 5:
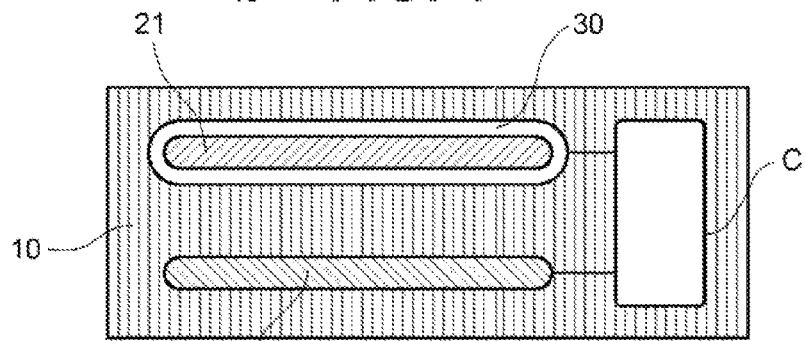

The filler 20 forms within the matrix 10 at least one conductive path 21, which, as explained below, defines an active electrode. In the example shown in FIGS. 1, 2 and 4, the conductive path 21 has an end 23 emerging from the matrix 10. In an alternative embodiment shown in FIG. 5, the conductive path 21 may be completely embedded within the matrix 10. The filler 20 may take the form of a predominantly one-dimensional structure such as a wire or a fibre, a predominantly two-dimensional structure such as a ribbon or a plate, or a predominantly three-dimensional structure such as a sphere or a cylinder.

The conductive path 21 consists of one or more conductor pieces distributed within the volume of the matrix 10. In the example of FIGS. 1 and 2, the conductor pieces (conductor filaments) are distributed in a disordered manner within the matrix 10. In an alternative embodiment (not shown), the conductive path may be formed by one or more conductor pieces distributed in an ordered manner in a three-dimensional arrangement.

At least one deformable gap 30 is formed between an outer surface of the conductive path 21 and an inner surface of the matrix 10. This gap 30 may be a single gap extending along the whole length of the conductive path 21 so as to cover the whole interface between the filler and the matrix, or may comprise separate segments covering respective portions of the conductive path 21. The gap 30 contains an electrically insulating fluid which may be a liquid or a gas, for example air.

The material of the matrix 10 may be a generally porous or spongy material, and therefore the gap 30 may be formed by some of the pores present in the material of the matrix.

The conductive path 21, which forms an active electrode, is adapted to be associated with a reference electrode 40 for forming an electrical signal output. In the device shown in FIGS. 1, 2 and 4, the reference electrode 40 is also embedded within the matrix 10 and has an end 43 which emerges from the matrix 10 and is adapted to be associated with the end 23 of the conductive path 21 of the filler 20 to form the electrical signal output. According to an alternative embodiment shown in FIG. 5, the reference electrode 40 may be completely embedded within the matrix 10.

Figure 8:
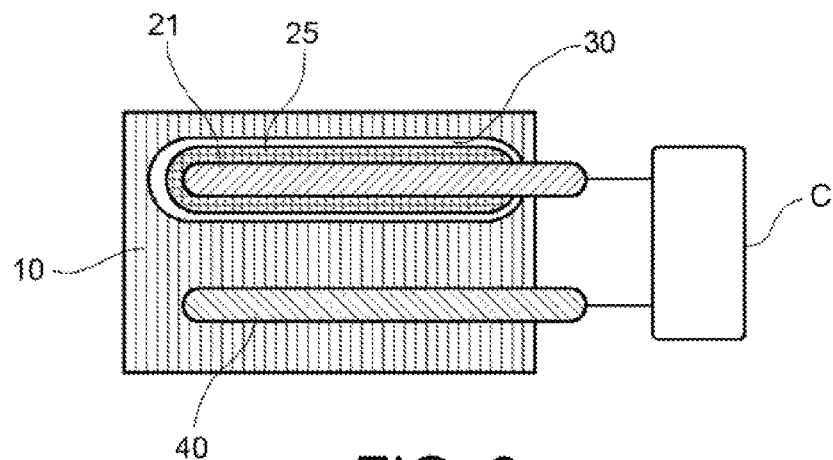
Figure 9:
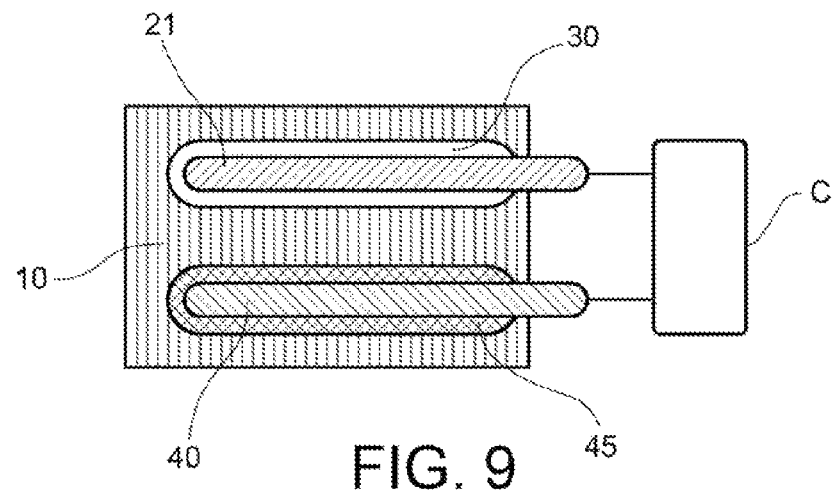
Figure 10:
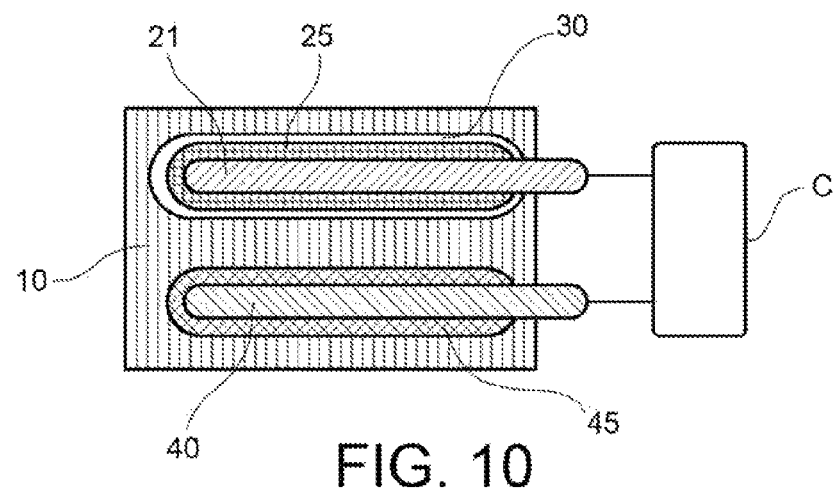

Around the reference electrode, the material of the matrix 10 forms a region 11 which is without gaps, or practically without gaps, so that the reference electrode 40 is without gaps, or practically without gaps, between its outer surface and the matrix 10. According to alternative embodiments, shown in FIGS. 8 to 10, a coating 25, 45 of electrically insulating material may be provided around the conductive path 21 and/or around the reference electrode 40; in all cases, it is essential for there to be at least one sufficiently extended deformable gap between the conductive path and the matrix (or, more precisely, between the coating 25 of the conductive path 21 and the matrix, if a coating is present), while the extension of the deformable gaps between the reference electrode and the matrix (or, more precisely, between the coating 45 of the reference electrode 40 and the matrix, if a coating is present) must be zero, or at least much smaller than that present at the interface between the conductive path and the matrix.

The reference electrode 40 is positioned so as to be electrically insulated from the conductive material of the filler 20.

Figure 6:
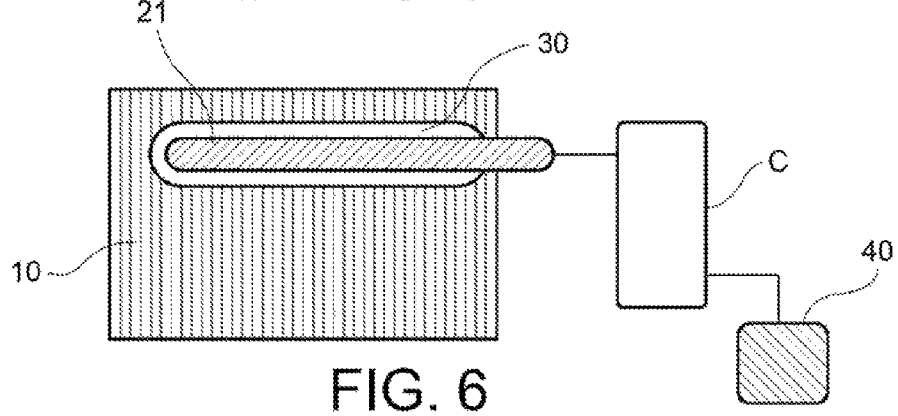
Figure 7:
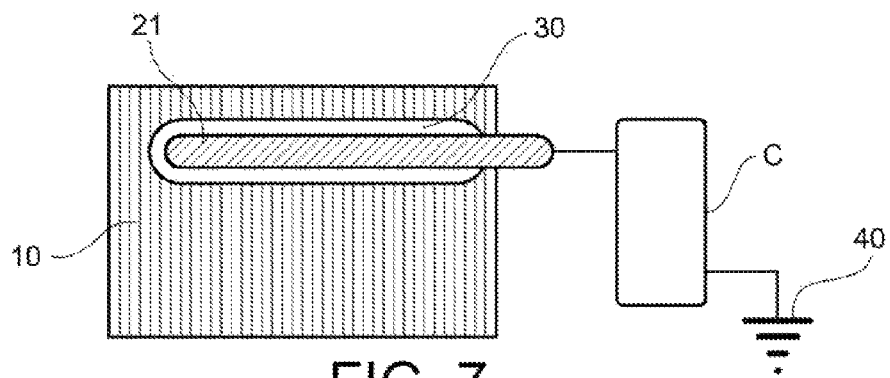

In alternative embodiments of the invention, the reference electrode may be positioned on an outer surface of the composite material, or may be entirely separate from the composite material (FIG. 6), for example in the form of an electrode connected to earth (FIG. 7).

Preferably, the matrix 10 is encapsulated within a coating 50 of water-impermeable material.

Because of the elasticity of the material of the matrix 10, the application of a mechanical load to the composite material causes the surface of the conductive path 21 and the surface of the matrix 10 to be brought closer together, or even to be in contact, and the subsequent removal of the mechanical load causes the surface of the conductive path 21 and the inner surface of the matrix 10 to be moved away from one another, because the elastic force of the material of the matrix 10 tends to return this material to an initial non-deformed state.

More generally, it is essential that a variation of a mechanical load applied to the composite material causes a variation in the distance between the outer surface of the conductive path 21 and the inner surface of the matrix 10.

At least one of the outer surface of the conductive path 21 and the inner surface of the matrix 10 may have surface patterns for increasing the triboelectric charge between these surfaces.

By repeatedly applying a mechanical stimulus to the composite material and removing it, a number of repeated contacts are made between the surfaces of the conductive path 21 of the filler 20 and of the matrix 10. The first contacts between these materials cause the respective surfaces to be electrically charged with opposed polarities, by the triboelectric effect. When the accumulated charge on these surfaces has reached saturation, the subsequent deformations of the composite material always produce a variation in the electrostatic potential difference between the conductive path 21 and the charged surface of the matrix 10.

The composite material is therefore capable of producing a signal, at the electrical signal output, depending on the electrostatic effect and on the triboelectric charge accumulated by the conductive path 21, in response to the mechanical stresses applied to the composite material.

Figure 3:
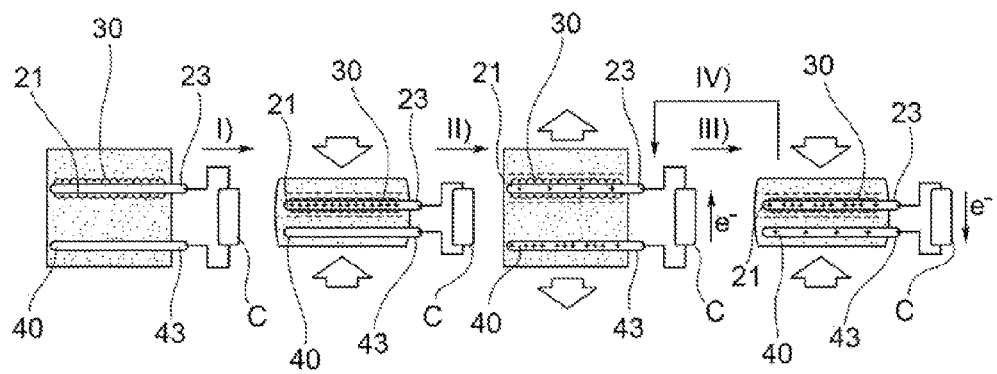
FIG. 3 shows the signal generation mechanism of the material according to the invention.

FIG. 3 shows a diagram illustrating the energy harvesting mechanism of the material according to the invention. In the first half of the operating cycle, as shown in FIG. 3.I, when the material is compressed, positive charges are generated on the conductive path 21, and negative charges are observed on the surface of the matrix 10 (assuming that the material of the matrix is lower than the material of the filler in the triboelectric series). This mechanism is the result of the triboelectric charge transfer at the interface between the materials within the composite, when these materials come into contact with one another. The negative triboelectric charges that are produced may be maintained for a long period on the surface of the insulating material of the matrix. However, the positive triboelectric charges on the conductive path 21 may be neutralized by the flow of electrons through a load C connected to the end 23 of the conductive path 21 and to the reference electrode 40. Consequently, no currents appear through the external circuit in the first half of the operating cycle.

In the second half of the operating cycle, when the material of the matrix 10 with the negatively charged surface starts to be separated from the conductive path 21, the positive charges induced on the conductive path 21 decrease, and thus the electrons flow from the reference electrode 40 to the conductive path 21, producing a positive current signal. This event causes the reference electrode to be positively charged (FIG. 3.II). When the two triboelectrically charged surfaces have been completely separated, an equilibrium state without any voltage/current output is created (FIG. 3.III). When the cycle is repeated and the composite is compressed again, the positive charges induced on the conductive path 21 increase, causing the electrons to flow from the conductive path 21 towards the reference electrode 40 to produce a negative current signal. When the materials of the matrix and the filler have been brought fully into contact, the charge surfaces are also fully in contact, and there is no more variation of the charges induced on the conductive path 21, so that no output signal is observed (FIG. 3.IV).

After a few cycles, the filler/matrix interface is saturated in triboelectric terms. Consequently, the charge transfer across this interface is halted, but the generation of charges between the electrodes continues, due to an electrostatic effect. In other words, since the contact surface at the filler/matrix interface has been charged previously, the contact between the filler and matrix surfaces (or simply the fact that they are brought towards one another) and their subsequent release results in a flow of electrons between the electrodes. When the surfaces are in contact, the opposed charges on the two materials substantially reach an equilibrium of charge distribution, and the charges induced on the electrodes then return through the load. However, when the contact is released, the flow of electrons between the electrodes compensates for the charge distribution in the composite.

The inventors have constructed some prototype devices made from the composite material according to the invention. The material used for the filler was, for example, pieces of copper wire taken from an electrical cable or from the mesh of the outer screen of a coaxial cable. A certain quantity of these pieces of wire was accumulated in a mould, into which a rapidly polymerizing resin, particularly PDMS, was cast to form the matrix. To produce the deformable gaps, the copper wires were coated in advance with a layer of sacrificial material, such as particles of sugar, ice or dry ice. Following polymerization, the composite material was subjected to further treatment to remove the sacrificial material, thus leaving air gaps between the filler and the matrix which imparted a porous or spongy structure to the composite material. It is considered that the necessary deformable gaps may also be produced by other methods, for example by blowing air or other gas into the material of the matrix before its polymerization, or by initiating chemical reactions and/or physical transformations within the matrix to form gas bubbles therein.

In order to form the reference electrode, a piece of wire previously coated with the material of the matrix was inserted into the mould before the resin casting.

The composite material produced in this way was then coated with a coating material such as silicone, to protect the material from external agents, particularly moisture.

In this way, the inventors produced objects having a similar shape to that shown in FIG. 1. Various measurements were made on these objects. In particular, experiments were conducted in which a compressive stress was repeatedly applied in a certain direction and then removed, and the electrical output signal of the device was measured; these experiments demonstrated that the device produced an output signal either with compressive stresses applied in the vertical direction (that is to say, in the direction perpendicular to the face from which the electrodes 23 and 43 emerge, as shown in FIG. 1), or with compressive stresses applied in the horizontal direction. This is due to the volumetric arrangement (with a distribution having a three-dimensional orientation) of the conductor wires within the matrix.

Clearly, the invention may be modified, in details of construction and operation, from what is described and illustrated above; in particular, characteristics described with reference to individual embodiments may be combined, where compatible, with characteristics described in relation to other embodiments.

REFERENCES

1. "Triboelectric nanogenerator built inside shoe insole for harvesting walking energy", Te-Chien Hou et al, NANO ENERGY, 2 (2013), 865-862
2. "Linear-Grating Triboelectric Generator Based on Sliding Electrification", Guang Zhu et al, NANO LETTERS, 5 (2013), 2282-2289
3. Patent application US 2013/0049531
4. "Power-generating shoe insole based on triboelectric nanogenerators for self-powered consumer electronics", Guang Zhu et al, NANO ENERGY, 2 (2013), 688-692

The invention claimed is:

1. Composite material, characterized by comprising a matrix of elastic and electrically insulating material, and a filler of electrically conducting material embedded within the matrix, said filler forming within the matrix at least one conductive path defining an active electrode adapted to be associated with a reference electrode for forming an electrical signal output, wherein at least one deformable gap containing an electrically insulating fluid is formed between an outer surface of the conductive path and an inner surface of the matrix, in such a way that a variation of mechanical load applied to the composite material causes a variation of distance between the outer surface of the conductive path and the inner surface of the matrix, said composite material being capable of producing a signal at the electrical signal output depending on the electrostatic effect and a triboelectric charge accumulated by the conductive path, in response to mechanical stresses applied to the composite material.

2. Material according to claim 1, wherein the material of the matrix is also a porous material, said at least one deformable gap consisting of pores of the material of the matrix.

3. Material according to claim 1, wherein the reference electrode is also embedded within the matrix and is adapted to be associated with the conductive path for forming the electrical signal output, the reference electrode being without, or nearly without, deformable gaps between its outer surface and the matrix.

4. Material according to claim 1, wherein said at least one conductive path consists of one or more conductor pieces distributed within the volume of the matrix.

5. Material according to claim 4, wherein said one or more conductor pieces are distributed in a disordered manner within the matrix.

6. Material according to claim 4, wherein said one or more conductor pieces are distributed in an ordered manner within the matrix, according to a three-dimensional orientation.

7. Material according to claim 4, wherein at least one of said outer surface of the conductive path and inner surface of the matrix has surface patterns for increasing the triboelectric charge.

8. Material according to claim 4, wherein the matrix is encapsulated within a coating of water-impermeable material.

* * * * *